United States Patent

Mittwollen et al.

[11] Patent Number: 5,836,334
[45] Date of Patent: Nov. 17, 1998

[54] ELECTROMAGNETICALLY ACTUATED VALVE FOR SLIP-CONTROLLED HYDRAULIC BRAKE SYSTEMS IN MOTOR VEHICLES

[75] Inventors: Norbert Mittwollen, Markgroeningen; Wolfgang Maisch, Schwieberdingen; Martin Oehler, Leingarten; Guenther Hohl; Hans-Peter Huebner, both of Stuttgart, all of Germany

[73] Assignee: Robert Bosch GmbH, Stuttgart, Germany

[21] Appl. No.: 722,198
[22] PCT Filed: Mar. 30, 1995
[86] PCT No.: PCT/DE95/00437
§ 371 Date: Jan. 27, 1997
§ 102(e) Date: Jan. 27, 1997
[87] PCT Pub. No.: WO95/28305
PCT Pub. Date: Oct. 26, 1995

[30] Foreign Application Priority Data

Apr. 13, 1994 [DE] Germany .......................... 44 12 648.4

[51] Int. Cl.⁶ ............................... F16K 31/06; B60T 8/36
[52] U.S. Cl. ..................... 137/1; 251/129.02; 303/119.2
[58] Field of Search ..................... 251/129.02, 129.15, 251/129.21; 303/119.2; 137/1

[56] References Cited

U.S. PATENT DOCUMENTS

| | | | |
|---|---|---|---|
| 5,167,442 | 12/1992 | Alaze et al. | 251/129.02 X |
| 5,295,656 | 3/1994 | Campbell et al. | 251/129.02 |
| 5,605,386 | 2/1997 | Ziegler et al. | 303/119.2 |
| 5,649,748 | 7/1997 | Oehler et al. | 251/129.02 X |

*Primary Examiner*—Kevin Lee
*Attorney, Agent, or Firm*—Edwin E. Greigg; Ronald E. Greigg

[57] ABSTRACT

An electromagnetically operated valve which attains an automatic establishment of a reduced flow cross section that is effective after a closing position of the valve. The valve has a magnet armature, longitudinally movable in a valve dome, with a valve tappet for actuation of a seat valve. The seat valve is located in a valve chamber from which pressure fluid conduits, leads to upper and lower face ends of the circumferentially sealed off magnet armature. When the valve is opening from the closing position, an additional force acting in the closing direction upon the magnet armature is generated because of the shaping of the seat valve, and as a result of this additional force the seat valve assumes a partly closed position that is different from its position of repose. The valve is applicable particularly to traction-controlled hydraulic brake systems of motor vehicles.

9 Claims, 2 Drawing Sheets

ELECTROMAGNETICALLY ACTUATED VALVE FOR SLIP-CONTROLLED HYDRAULIC BRAKE SYSTEMS IN MOTOR VEHICLES

PRIOR ART

The invention is based on an electromagnetically actuated valve, especially for slip-controlled hydraulic brake systems in motor vehicles. The invention also relates to a method for switching such a valve.

Such a valve is known from German Patent Disclosure DE 39 34 771 Cl. It has a control piston, forming a stop for the magnet armature, disposed in the valve dome; the piston is guided longitudinally displaceably on a tappet that originates at the valve body and penetrates the magnet armature. With its bottom remote from the armature, the control piston defines the control chamber, which communicates with the pressure fluid inlet of the known valve through a pressure fluid conduit that penetrates the tang and the control piston coaxially. While the magnet armature is pressure-equalized on both face ends, pressure fed into the control chamber is capable of displacing the control piston axially toward a stop. As a result, the stroke of the magnet armature is reduced by a predetermined amount, and the consequence is throttling of the flow cross section.

This mode of operation of the known valve is usable in slip-controlled hydraulic brake systems, in which the pressure fluid inlet communicates with the master cylinder and the pressure fluid outlet communicates with one wheel brake cylinder. For instance if in brake slip control the valve is switched into its closing position by excitation of the magnet coil, and on reduction of the pressure in the wheel brake cylinder a pressure drop of sufficient height is created between the pressure fluid inlet and the pressure fluid outlet, this causes the above-described displacement of the control piston, with the result that when the valve opens the aforementioned throttling of the flow cross section becomes operative as long as the pressure difference exists between the inlet and the outlet. Because of the reduced pressure gradient when a pressure buildup of brake slip control follows a pressure reduction, the reduction in the flow cross section has an advantageous effect on the quality of control and on the noise produced by the brake system. In normal braking without the danger of wheel locking, conversely, the full flow cross section of the valve is available, which favors a desired short response time of the brake system upon brake actuation.

However, the permanent setting of the throttle flow cross section in the known valve is a disadvantage, because it subjects the flow quantity to fluctuations dependent on the differential pressure. Moreover, the flow quantity is quite substantially dependent on the absolute magnitude of the flow cross section; that is, the stop needs to have a very close tolerance. Moreover, the valve is relatively expensive, because of the required control piston.

ADVANTAGES OF THE INVENTION

The valve according to the invention has the advantage over the prior art that the flow cross section of the seat valve adjusts automatically to largely constant flow quantities that are less than in full opening, as a function of the forces acting on the armature, but without magnetic force, given a sufficiently large pressure drop between the inlet and outlet side of the valve. The engineering expense for achieving this mode of operation of the valve of the invention as a flow regulating valve is extraordinarily slight, because the generation of pressure head in the partial valve chamber is effected by a stroke-dependent deflection of the flow of pressure fluid in the geometrically relatively simply shaped seat valve region. Since only the valve tappet determines the mode of operation, the functional reliability of the valve is very high.

Advantageous further features of and improvements to the valves possible by means of the provisions recited hereinafter.

Suitable features for the seat valve region can be achieved at low production expense.

The further feature of the invention is advantageous because as a result, in a simple way, a separation in terms of pressure of the two armature face ends is created, for creating force exerted on the magnet armature.

Suitable embodiments of the armature seals are also disclosed.

The method according to the invention for switching the disclosed valve is advantageously distinguished in that the hydraulic forces acting on the magnet armature have an electromagnetically generated force superimposed on them, which can be utilized to control the brake pressure gradients. The control behavior of the brake system can favorably be affected as a result.

BRIEF DESCRIPTION OF THE DRAWINGS

One exemplary embodiment of the invention is shown in simplified form in the drawing and described in further detail in the ensuing description.

DESCRIPTION OF THE EXEMPLARY EMBODIMENT

Figure 1:
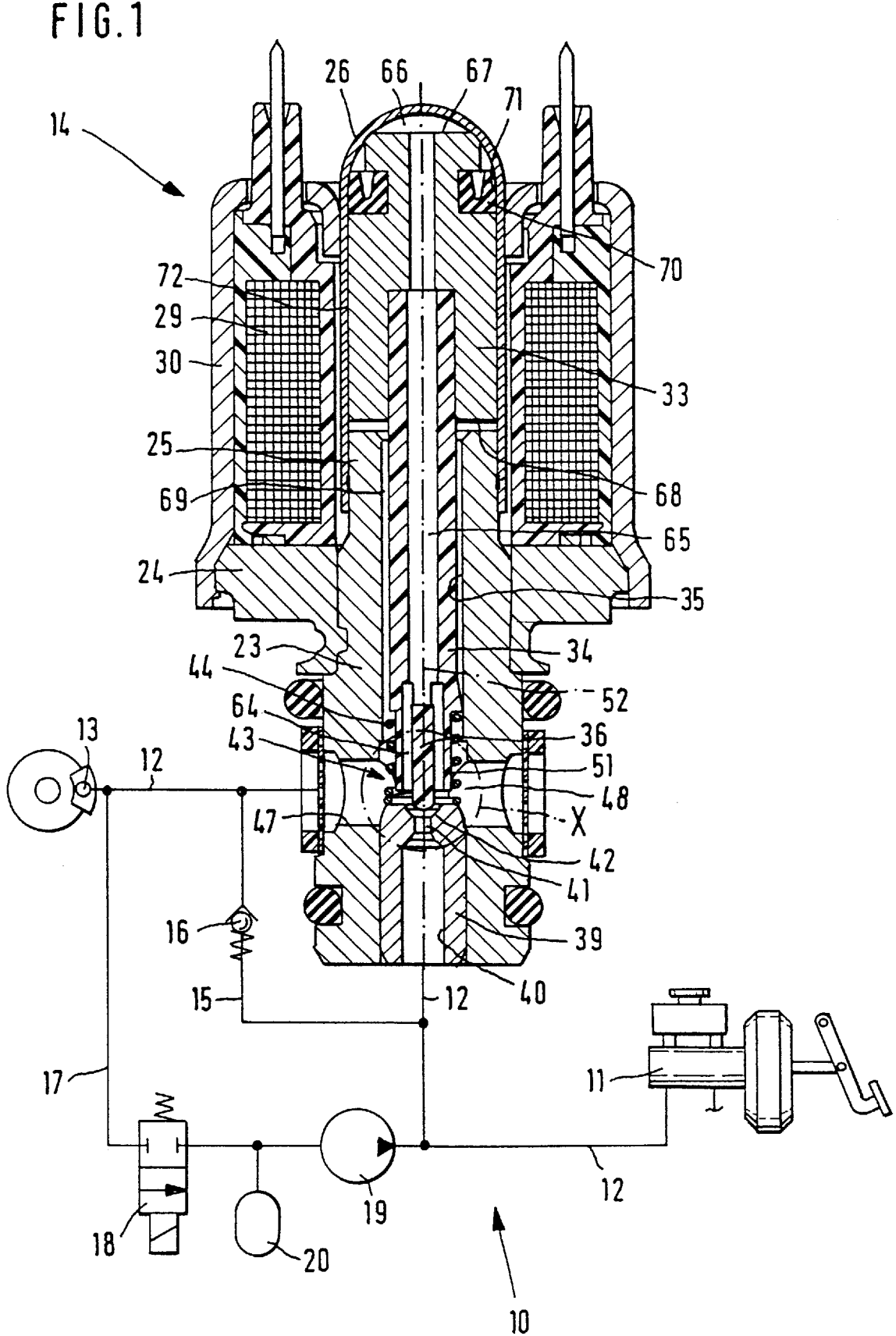
FIG. 1 is a longitudinal section through an electromagnetically actuated valve in a schematically illustrated brake system of a motor vehicle.

A brake slip controlled hydraulic brake system 10 of a motor vehicle, shown greatly simplified in FIG. 1, has a dual-circuit master cylinder 11, from which a brake line 12 extends to a wheel brake cylinder 13. Disposed in the course of the brake line 12 is an electromagnetically actuated valve 14 that in slip control acts as an inlet valve. Located in a bypass line 15 around the valve 14 is a check valve 16, whose open direction is from the wheel brake cylinder 13 to the master cylinder 11. A return line 17 originates at the brake line 12 on the side toward the wheel brake cylinder; the return line bypasses the valve 14 and the check valve 16 and is connected on the master cylinder side to the brake line 12. An outlet valve 18 and a return pump 19 for pressure fluid drawn from the wheel brake cylinder 13 are located in the return line 17. A storage chamber 20 is connected to the return line 17 between the outlet valve 18 and the return pump 19.

The electromagnetically actuated valve 14 has a valve housing 23, intended for reception in a valve block, not shown, which is firmly joined to a yoke disk 24. Beyond the yoke disk 24, the valve housing 23 is continued in the form of a pole core 25. A closed, tubular valve dome 26 is mounted on the pole core 25. It is tightly joined to the pole core 25 by welding. On the side remote from the pole core, the valve dome 26 has a hemispherical termination.

The valve dome 26 is embraced by an annular magnet coil 29. A bell-shaped housing 30 surrounds the magnet coil 29.

The housing 30 engages the valve dome 26 on one end; on the other add, the housing is joined to the yoke disk 24.

Figure 2:
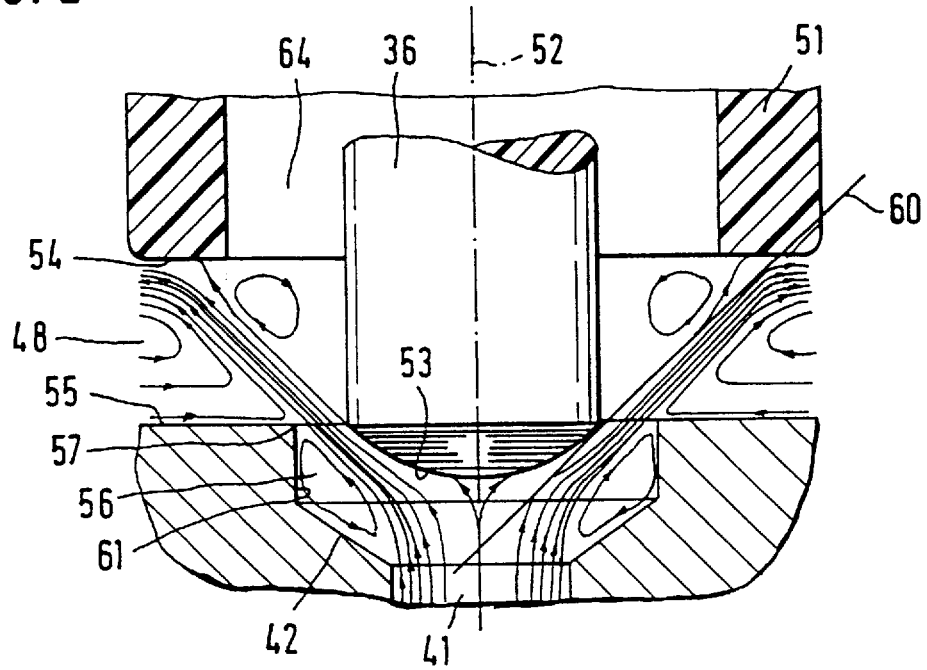
FIGS. 2 and 3 show flow courses in the seat valve region, marked X in FIG. 1, of the valve as it assumes its open position (FIG. 2) and its partly closed position (FIG. 3).
Figure 3:
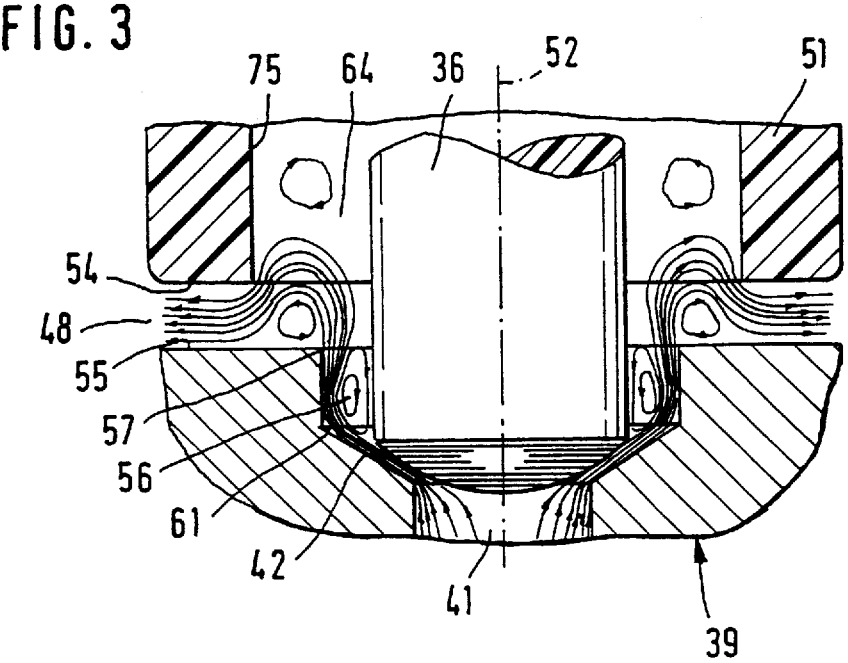

A substantially circular-cylindrical magnet armature 33 is received longitudinally movably in the valve dome 26, which is closed toward the coil. A valve tappet 34 firmly joined to the magnet armature 33 extends from the magnet armature. (In a departure from the exemplary embodiment, it is also sufficient if the valve tappet 34 engages the magnet armature 33 nonpositively and in pressure-tight fashion between the inner bore 65 and the longitudinal bore 35.) The valve tappet 34 is received with play in a longitudinal bore 35 of the pole core 25 and the valve housing 23. On its end remote from the armature, the valve tappet 34 has a closing member, designated as a valve needle 36 (FIGS. 2 and 3).

In the portion of the longitudinal bore 35 remote from the armature, a sleevelike valve body 39 is press-fitted in place, with a stepped bore 40 that discharges into a valve seat 42 downstream of a smaller-diameter through bore 41. The valve seat 42 is embodied as a hollow cone, with a cone angle of approximately 110°. The valve needle 36 and the valve seat 42 form a seat valve 43 of the electromagnetically actuated valve 14. When the magnet coil 29 is not excited, the seat valve 43 assumes its open position as the position of repose, because of the action of a prestressed restoring spring 44 that on one end engages the valve tappet 34 and on the other engages the valve body 39.

The valve housing 23 is provided with a transverse bore 47 that intersects the longitudinal bore 35 at a right angle. In the penetration region of the two bores 35 and 37, a valve chamber 48 that receives the seat valve 43 is created. The valve chamber communicates on one side with the stepped bore 40, as a pressure fluid inlet to the valve 14, via the valve seat 42 and the through bore 41 central to it. On the other side, a pressure fluid outlet formed by the transverse bore 47 is connected to the valve chamber 48. (The terms inlet and outlet pertain to the brake pressure buildup in the wheel brake cylinder 13. In non-slip-controlled braking, the valve 14 has a flow of pressure fluid through it in the opposite direction as well.)

Also located in the valve chamber 48 is a guide body for pressure fluid, in the form of a straight hollow-cylindrical sleeve part 51 formed onto the valve tappet 34. The sleeve part 51 extends coaxially with the axis 52 of the valve needle 36 embodied as a straight circular cylinder. The valve needle is bounded in a ball on its face end toward the valve seat 42. The seat valve 43 thus has a cone and ball configuration, which unlike the exemplary embodiment may also be embodied with a conically defined valve needle and a spherically defined valve seat. Opposite the face end 53 of the valve needle 36 toward the valve seat, the sleeve part 51 is axially set back with its face end 54 toward the valve chamber. Toward this face end 54 and the face end 55 toward the valve chamber of the valve body 39 are located in planes that extend radially between 90° and 45°, and preferably 90°, from the valve needle axis 52. Another feature of substantial significance is that the valve seat 42 is located in a straight circular-cylindrical indentation 56 of the valve body 39. Toward the face end 55 of the valve body 39 on the side of the valve chamber, this indentation 56 is defined by an edge 57. The indentation 56 has a diameter that is equal to or smaller than the inside diameter of the sleeve part 51. In the exemplary embodiment shown, with an axially parallel-defined through bore 41 and indentation 56 of the valve body 39 and valve needle 36 and sleeve part 51 of the valve tappet 34, the diameter of the indentation 56 is located approximately in the middle between the diameter of the valve needle 36 and the inside diameter of the sleeve part 51.

In the open position of the valve 14, shown in FIG. 2, the face end 53 of the valve needle 36 extends approximately within the orifice region of the indentation 56 toward the valve chamber. A tangent 60 located in the peripheral region of the face end 53 of the valve needle 36 and intersecting the valve needle axis 52 at an angle of approximately 45° extends past the face-end edge 57 of the indentation 56, without touching it, in the open position. The axial setback of the face end 54 of the sleeve part 51 is chosen to be so great that the tangent 60 meets this face end, or if the axial setback is increased, it extends past the face end of the sleeve part without touching it.

In the partly closed position of the valve 14 shown in FIG. 3, the valve needle 36 has plunged so far into the indentation 56 that the tangent 60, not shown in FIG. 3, meets the jacket wall 61 of the indentation 56. In the partly closed position of the valves, the two face ends 54 and 55 toward the valve chamber of the sleeve part 51 and valve body 39 assume an axial spacing that compared with the open position is reduced to less than half.

The through bore 41, the valve seat 42 and the indentation 56 of the valve body 39, like the valve needle 36 and the sleeve part 51 of the valve tappet 34, all extend coaxially with the axis 52, so that a partial valve chamber 64 of limited axial length, in the form of an annular gap, is formed between the valve needle and the larger-diameter sleeve part. Remote from the valve seat, a first pressure fluid conduit 65 extending from the partial valve chamber 64 in the valve needle axis 52, leads to a control chamber 66, which is located between the valve dome 26 and the face end 67 of the magnet armature 33 remote from the closing member. Radially outside the sleeve part 51, a second pressure fluid conduit 69 extends from the valve chamber 48, leading to the face end 68 of the magnet armature 33 near the closing member. The control chamber 66 is sealed off, at the circumference of the magnet armature 33, from its face end 68 near the closing member, specifically by a sealing cuff 70, received on the magnet armature, whose sealing lip 71 that engages the valve dome is aligned with the control chamber. In a departure from the exemplary embodiment, however, it may also be adequate to seal off the magnet armature 33 from the valve dome 26 only by means of a gap seal 72.

The mode of operation of the valve 14 is as follows:

Upon braking tripped by the driver of the vehicle when there is no threat of wheel locking, the valve 14 assumes its position of repose shown; that is, the seat valve 43 is opened. The pressure generated by actuation of the master cylinder 11, by displacing partial quantities of pressure fluid in the brake line 12, causes a pressure rise in the wheel brake cylinder 13. As can be seen from flow lines in FIG. 2, the displaced pressure fluid, coming from the through bore 41, enters the valve seat 42 and then leaves it, flowing tangentially around the face end 53 of the valve needle 36, as a pressure fluid stream shaped like a hollow cone. In the region of the face end 54 of the sleeve part 51, this stream undergoes a deflection in the radial direction. After that, the pressure fluid emerges from the valve chamber 48 into the pressure fluid outlet of the valve 14. No change of pressure, caused by the pressure fluid flow, occurs in the partial valve chamber 64. The pressure rise or drop effected by the actuated master cylinder 11 conversely causes pressure changes at both face ends 67 and 68 of the magnet armature 33, over the course through the two pressure fluid conduits 65 and 69, but these changes compensate for one another. Under the influence of the restoring spring 41, the magnet armature 33 with the valve tappet 34 thus remains in its position of repose in this kind of braking. If the driver reduces the brake pressure or terminates the braking, then the pressure fluid takes its course in the opposite flow direction through the open seat valve 43 and through the check valve 16, which is disposed parallel to the valve 14, in the direction of the master cylinder 11.

On braking when the threat of wheel locking does exist, the valve 14 is switched by excitation of the magnet coil 33 into the working position, in which the seat valve 43 is moved to its closing position, by displacement of the magnet armature 33 and valve tappet 34 counter to the force of the restoring spring 44. At the same time, the outlet valve 18 in the return line 17 is switched to the open position, and the return pump 19 is put into operation. By drawing partial quantities of pressure fluid from the wheel brake cylinder 13 and returning it to the master cylinder 11, pressure is decreased toward the wheel brake, and the threat of locking is reduced. In the phase for pressure holding in the wheel brake cylinder 13, which follows a pressure reduction phase, the valve 14 remains in the operating position, while the outlet valve 18 in the return line 17 is switched into the closing position.

For the pressure buildup in the wheel brake cylinder 13, the outlet valve 18 maintains its closing position, and current is no longer supplied to the valve 14. This causes a displacement of both the magnet armature 33 and the valve tappet 34 along with the valve needle 36 and the sleeve part 51 in the direction of the control chamber 66, because of the action of hydraulic forces and of the restoring spring 44, so that the valve needle 36 begins to open the valve seat 42, and the seat valve 43 is opened. Because of the preceding pressure reduction in the wheel brake cylinder 13, a pressure gradient exists between the inlet side and the outlet side of the seat valve 43. The lower pressure on the outlet side is operative, through the second pressure fluid conduit 69, on the face end 68 of the magnet armature toward the closing member. During the opening motion of the magnet armature 33, pressure fluid at higher pressure flows from the master cylinder 11 into the valve chamber 48. As can be seen from the flow lines in FIG. 3, in the partly closed position of the seat valve 43 the pressure fluid, after separation from the face end 53 on the valve needle 36, meets the jacket wall 64 of the indentation 56 in the valve body 39 and undergoes an approximately axially parallel deflection toward the partial valve chamber 64 that extends between the valve needle and the inner jacket face 75 of the sleeve part. Since this partial valve chamber, because of the sealed-off control chamber 66, has no outlet the pressure fluid reverses its flow direction and passes through the narrow gap between the face ends 54 and 55 of the sleeve part 51 and valve body 39 back to the pressure fluid outlet. This flow course of the pressure fluid streams produces a pressure head in the partial valve chamber 64, which through the first pressure fluid conduit 65 becomes operative in the control chamber 66. The magnet armature 33, which as a result is not pressure-equalized (there is lower pressure on the face end 68 near the closing member and higher pressure on the face end 67 remote from the closing member), is thus subjected to a force opposite that of the restoring spring 44, causing the magnet armature 33 and valve tappet 34 to assume a (partly closed) position between the closing position and the open position of the seat valve 43. The resultant reduction in the flow cross section of the seat valve 43 causes throttling of the flow of pressure fluid, with a slower rate of pressure increase in the wheel brake cylinder 13. If the pressure gradient is sufficient, the valve 14 regulates the flow quantity to a largely constant amount, since a higher differential pressure between the inlet side and the outlet side produces a higher pressure head, with resultant reduction in the flow cross section of the seat valve 43, and vice versa.

With the pressure gradient that decreases from pressure buildup in successive phases, the pressure head in the partial valve chamber 64 decreases as well. The restoring spring 44 returns the magnet armature 33 and the valve tappet 34 to its position of repose, in which the seat valve 43 makes its full cross section available for ensuing braking operations. However, if when the flow cross section of the seat valve 43 is reduced, the braking is discontinued by relief of the master cylinder 11, then the pressure fluid can also flow out unthrottled and undelayed from the wheel brake cylinder 13, through the check valve 16.

In the mode of operation described above with the partially closed position of the seat valve 43, the magnet coil 29 is currentless, and the magnet armature 33 is subjected only to hydraulic forces and to the force of the restoring spring 44. The valve 14 thus enables a slow pressure buildup, which is largely independent of differential pressure, in the wheel brake cylinder 13, this buildup being determined by the ratios of the geometrical areas of the valve 14 at the magnet armature 33 and at the valve tappet 34. The pressure buildup can be slowed down by means of slight additional forces in the valve closing direction. These additional forces may be generated as magnetic forces, by moving the valve 14 out of its closing position into a still further-reduced partly closed position by supplying current to its magnet coil 29, with a current of low constant height or with a medium-frequency or high-frequency pulsed current. This current is lower than the current required to switch the valve 14 into its closing position. The height of the current makes it possible to vary the pressure gradients in the brake pressure buildup.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuated valve (14), for slip-controlled hydraulic brake systems in motor vehicles, having the following characteristics:

a magnet armature (33) which is received longitudinally movably in a valve dome (26), the valve dome (26) is embraced by a magnet coil (29), a valve tappet (34) with a closing member (36) is disposed remote from the armature and extends from the magnet armature (33), a valve body (39) having a valve seat (42) with a central through bore (41) as a pressure fluid inlet is secured in a housing (23) of the valve (14), a resting spring (44) lifts the closing member (36) from the valve seat (42) when the magnet coil (29) is not excited, the closing member (36) and a portion of the valve body (39) that has the valve seat (42) forms a seat valve (43) which is located in a valve chamber (48) which communicates with a pressure fluid outlet of the valve (14), the valve chamber (48) has a partial valve chamber (64), acting as a pressure head chamber and enclosed by a sleeve part (51) of the valve tappet (34) that can be moved with the magnet armature (33), and a first pressure fluid conduit (65) leads from the partial valve chamber to a control chamber (66), which is located between the valve dome (26) and a first face end (67) of the magnet armature (33) remote from the closing member, a second pressure fluid conduit (69) extends from the valve chamber (48), leading to a second face end (68) of the magnet armature (33) near the closing member, a pressure generated in the partial valve chamber (64) is capable in the control chamber (66) of causing a force which acts counter to the force of the restoring spring (44), and as a result the seat valve (43) assumes a partly closed position different from its position of repose, the seat valve (43) has a cone and ball configuration, in which the valve seat (42) is conical and the closing member (36) is spherical on a third face end, the valve seat (42) is located in an at least approximately straight, circular-cylindrical indentation (56) of the valve body (39), said valve body is limited toward the valve chamber (48) by an at least approximately radially extending fourth face end (55), the valve tappet (34) changes toward the valve seat into an at least approximately cylindrical valve needle (36) that forms the closing member and that is coaxially embraced by a sleeve part (51), both with radial spacing and with an axial setback relative to a fifth face end (53) on the valve seat side, the axial setback of the sleeve part (51) is dimensioned such that a tangent (60), placed in the peripheral region of the valve needle face fifth end (53) and intersecting a valve needle axis (52), meets a sixth face end (54) of the sleeve part (51) or extends past the sleeve part on an outside of the sixth face end without touching the sixth face end, in the open position of the seat valve (43), the fifth face end (53) of the valve needle (36) extends at least approximately in an orifice region, toward the valve chamber, of the indentation (56), so that the tangent (60) extends past a face-end edge (57) of the indentation without touching the face end edge, while in the partly closed position of the seat valve, the tangent (60) meets the jacket wall (61) of the indentation.

2. A valve in accordance with claim 1, in which the tangent (60) forms an angle between 30° and 60°, preferably 45°, with the valve needle axis (52).

3. A valve in accordance with claim 1, in which the indentation (56) of the valve body (39) has a diameter which is equal to or smaller than an inside diameter of the sleeve part (51).

4. A valve in accordance with claim 3, in which the diameter of the indentation (56) is located at least approximately in the middle between the diameter of the valve needle (36) and the inside diameter of the sleeve part (51).

5. A valve in accordance with claim 1, in which the through bore (41) and the indentation (56) of the valve body (39), the valve needle (36), and an inner jacket face of the sleeve part (51) of the valve tappet (34) are defined axially parallel, while the fourth and fifth face ends (55,53) toward the valve chamber of the sleeve part (51) and valve body (39) are located in planes that extend radially between 90° and 45°, preferably 90°, from the valve needle axis (52).

6. A valve in accordance with claim 1, in which the control chamber (66) is sealed off circumferentially of the magnet armature (33) from the second face end (68) near the closing member.

7. The valve in accordance with claim 6, in which the magnet armature (33) has a sealing cuff (70), whose sealing lip (71) engaging the valve dome (26) is aligned with the control chamber (66).

8. The valve in accordance with claim 6, in which the magnet armature (33) is sealed off from the valve dome (26) by a gap seal (72).

9. A method for switching an electromagnetically actuated valve (14) in a slip-controlled hydraulic brake system (10) of a motor vehicle which comprises disposing the valve between a master cylinder (11) and a wheel brake cylinder (13) in a brake line (12), and upon slip control for brake pressure reduction in the wheel brake cylinder (13) moving the valve into a closing position by applying current to a magnet coil (29) which applies a magnetic force on an armature, while in the currentless state, the valve can be moved into its open position for brake pressure buildup, moving the valve (14) out of its closing position into a further-reduced, partly closed position by applying a modified, movable current to a magnet coil (29) with a current of low constant height or with a medium-frequency or high-frequency pulsed current that is lower than a current for closing the valve (14), and simultaneously applying a hydraulic force onto the armature, whereby the magnetic force and the hydraulic force act counter to a spring force of a restoring spring (44).

* * * * *